(12) United States Patent
Matsuzaki (10) Patent No.: US 6,252,327 B1
(45) Date of Patent: Jun. 26, 2001

(54) STATOR HAVING CONDUCTOR BARS AND JOINT PLATES

(75) Inventor: Akio Matsuzaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,265

(22) Filed: Mar. 17, 2000

(30) Foreign Application Priority Data

Mar. 19, 1999 (JP) .................................................. 11-075583

(51) Int. Cl.$^7$ .................................................. H02K 17/00
(52) U.S. Cl. .......................... 310/201; 310/180; 310/195; 310/198
(58) Field of Search .................................. 310/254, 179, 310/201, 198, 260, 270, 271; 29/596–598

(56) References Cited

U.S. PATENT DOCUMENTS

| 2,407,935 | * | 9/1946 | Perfetti et al. | 310/201 |
| 4,309,634 | * | 1/1982 | Koroly et al. | 310/201 |
| 4,321,497 | * | 3/1982 | Long | 310/198 |
| 5,587,619 | * | 12/1996 | Yumiyama et al. | 310/201 |

* cited by examiner

*Primary Examiner*—Tran Nguyen
(74) *Attorney, Agent, or Firm*—Birch, Stewart, Kolasch & Birch, LLP (57) ABSTRACT

A motor stator structure having a plurality of slots aligned with an axial direction of a stator core. The stator structure includes straight conductors having cross-sections that substantially conform with the cross-section of the slots in the stator core. The conductors are connected in circuits by joint plates, the ends of the conductors being riveted to holes within the joint plates.

15 Claims, 9 Drawing Sheets

STATOR HAVING CONDUCTOR BARS AND JOINT PLATES

BACKGROUND OF THE INVENTION

1. Field of the Invention

The present invention relates to a structure for an outer stator of an inner rotor-type motor.

2. Background Art

In conventional stator structures, a plurality of slots are formed in a circumferential direction so as to be aligned along the axial direction at the inner surface of a stator core formed in the shape of a cylinder. A plurality of stator windings are inserted into one slot.

Inserting the plurality of stator windings in line with the cross-sectional shape of the slots is difficult and gaps occur between the windings and the inner surfaces of the slots. The gaps are due to the insertion of windings having circular cross-sections, which is undesirable. This also limits the space for conductors in a slot. In addition, ohmic loss due to the splitting of the volume of the slots is substantial, and cooling is poor.

There is therefore a need for a small motor in which assembly of the conductor into the slot is straightforward, the space for a conductor within the slot is increased, and ohmic loss is reduced.

SUMMARY OF THE INVENTION

It is an object of the present invention to overcome the deficiencies of conventional motor stator structures. The present invention includes a motor stator structure in which a plurality of slots oriented in an axial direction are formed at an inner peripheral surface of a cylindrical stator core. Conductors having a substantially conforming cross-sectional shape with the slots are inserted into the slots.

Because the cross-sectional shape of the slots and the conductors substantially conform, the space available for the conductors is increased by up to 100%, ohmic loss is reduced, and cooling is increased.

One conductor may be inserted into each slot of the motor stator structure. When one conductor is inserted into one slot, there are no gaps between windings such as when a plurality of windings are inserted. This arrangement maximizes the capacity of the slots and the space available for the conductor.

The slots of the stator core may be rectangular and extend along a radial direction. A large number of slots can therefore be formed at the inner surface of the stator core, the number of conductors can be increased, and motor performance can therefore be improved.

The conductors can be straight bus bars, and arc-shaped joint plates are arranged along the side surfaces of the stator core. Ends of the joint plates are riveted to the ends of predetermined pairs of bus bars to form a circuit. Because the bus bars are straight, assembly into the slots of the stator core is straightforward.

It is not necessary to bend the ends of a bus bar for coupling because joint plates for coupling prescribed pairs of bus bars are used for this purpose. There is therefore no added difficulty, even when the cross-sectional area of the bus bars is large. Accordingly, substantial space can be maintained for conductors within the slots of the stator core.

The joint plates are arc-shaped and flat, and are arranged on substantially concentric circles at the annular-shaped side surface of the stator core. The stator is therefore compact.

The joint plates and bus bars are riveted together, which makes assembly straightforward and conductivity high.

Long first joint plates and short second joint plates have ends that are bent radially inwards in a deformed C-shape, and a third joint plate has ends bent outwards in the circumferential direction in a deformed C-shape. The plates are arranged on the side surfaces of the stator core.

The entire stator circuit can be constructed by coupling pairs of conductors using the first, second and third types of joint plates. There are therefore few parts and assembly is simplified. The number of overlaid joint plates can be reduced and the stator can be made compact because long first joint plates and short second joint plates can be combined on the same surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The motor of present invention is a d.c. brushless motor where an outer motor stator 1 includes a three-phase armature circuit assembled at the outer periphery of an inner rotor that forms a magnetic field using a permanent magnet.

Figure 1:
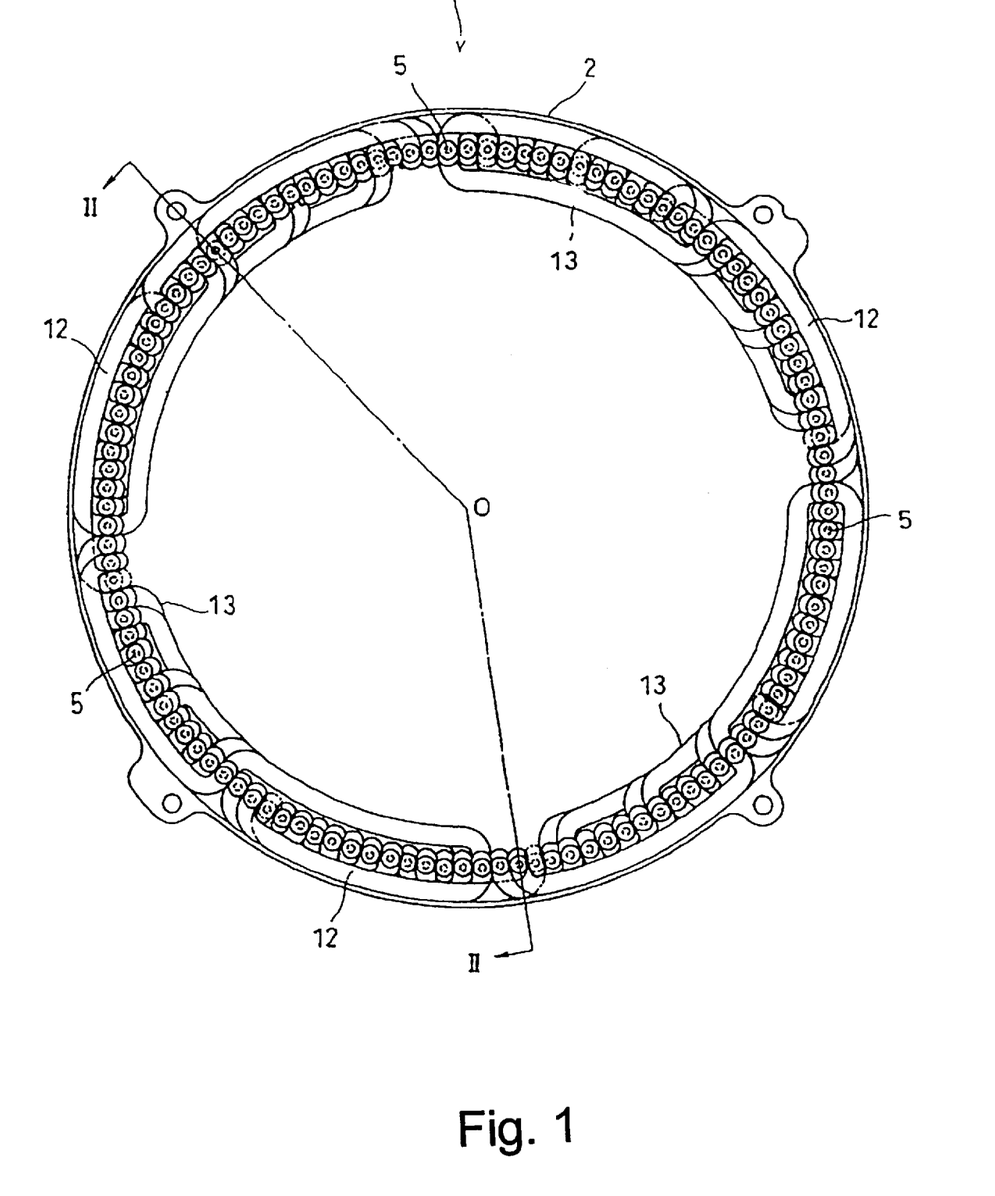
FIG. 1 is a front view of the outer stator of a d.c. brushless motor of an embodiment of the present invention.
Figure 4:
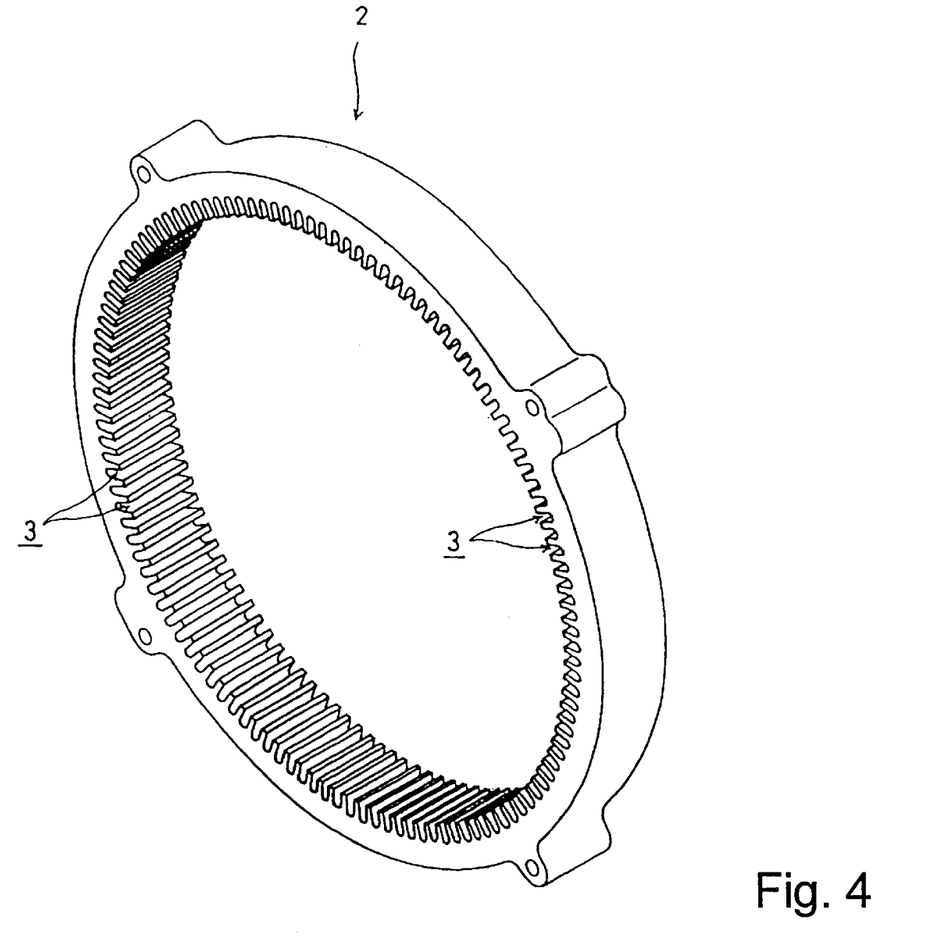
FIG. 4 is a perspective view of a stator core.

FIG. 1 is a front view with parts of the outer stator 1 omitted. A stator core 2 of an outer stator 1 forms a flat cylinder, as shown in FIG. 4, with a plurality of slots 3 formed in a circumferential direction at the inner surface of the stator core 2. The slots are aligned with the axial direction of the outer stator 1.

As shown in FIG. 4, the cross-sectional shape of one slot 3 is substantially rectangular (with rounded inner corners) and extends in a radial direction. The slot 3 is long in the radial direction and narrow in the circumferential direction. A large number of slots 3 of a prescribed cross-sectional surface area can therefore be formed along the inner periphery of the stator core 2. Bus bars 5 are straight conductors and are inserted one at a time into each slot 3 of the fixed stator 2.

Figure 5:
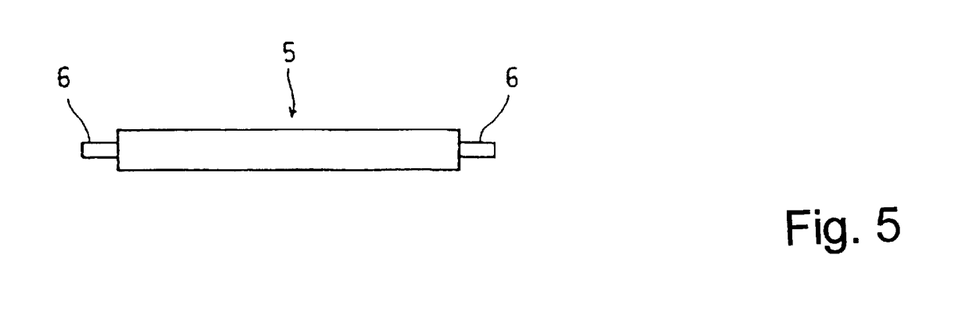
FIG. 5 is a side view of a bus bar.
Figure 6:
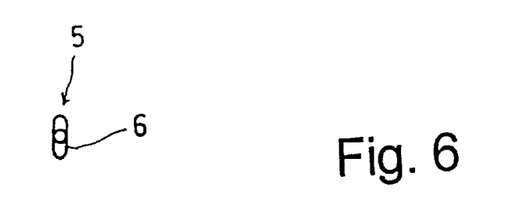
FIG. 6 is a front view of a bus bar.

Referring to FIG. 5 and FIG. 6, the cross-sections of the bus bars 5 to be inserted into the slots 3 are substantially the same essentially rectangular shape (flat sides with elliptical end surfaces) as the cross-sections of the slots 3. The bus bars 5 have a length that is longer than the width of the stator core 2 in the axial direction, and have columnar projections 6 projecting from the center of both end surfaces thereof.

Figure 7:
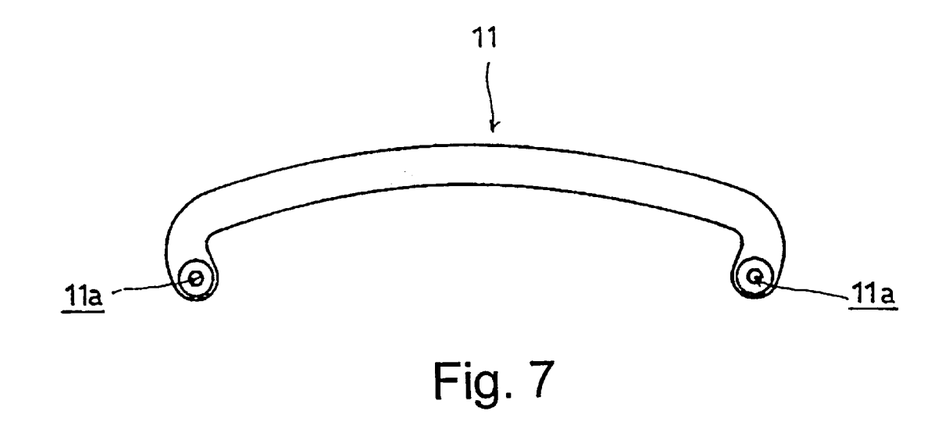
FIG. 7 is a side view of a first joint plate.
Figure 8:
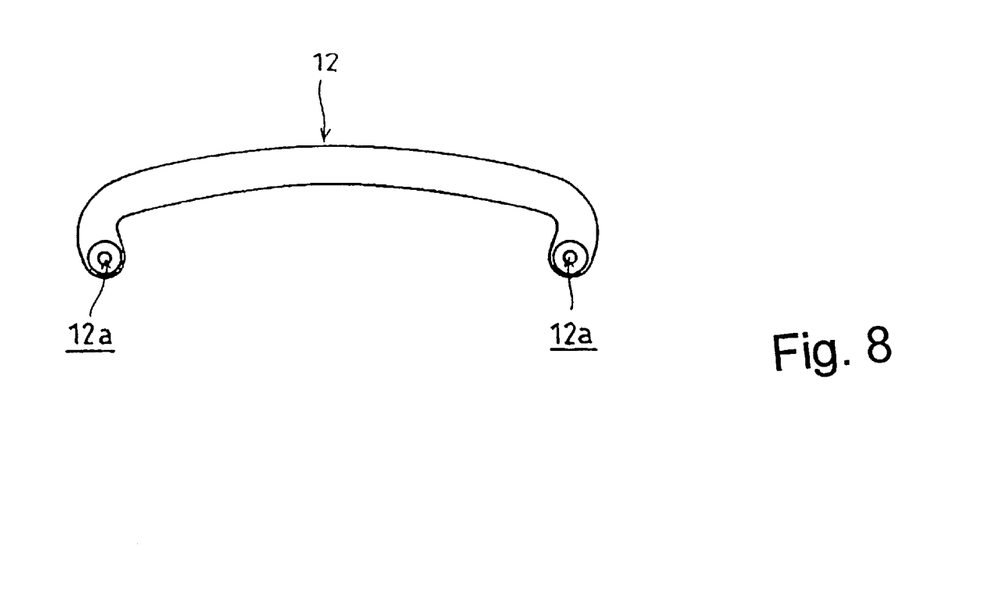
FIG. 8 is a side view of a second joint plate.
Figure 9:
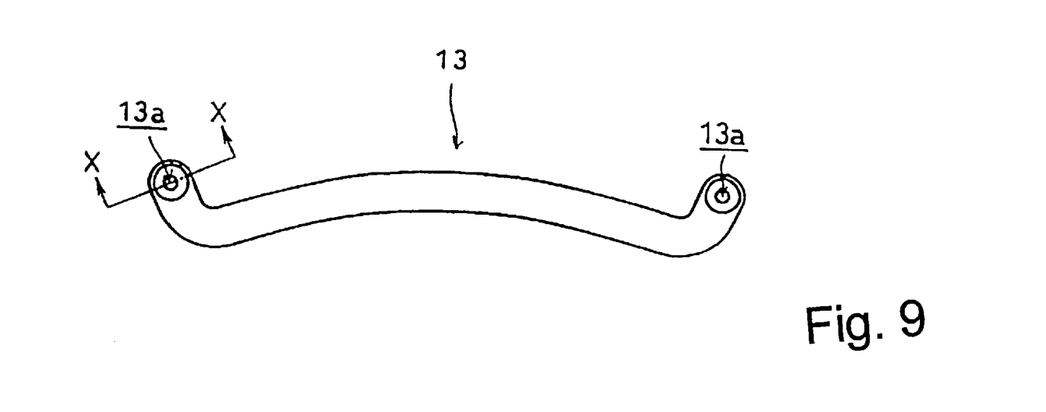
FIG. 9 is a side view of a third joint plate.

The bus bars 5 are made of aluminum. Joint plates linking the projections 6 of the bus bars 5 couple fellow bus bars together. Three types of joint plates are used. FIGS. 7–9 show the three types of joint plates used.

FIG. 7 show a first joint plate 11. The first joint plate 11 is an aluminum plate that is arc-shaped when viewed from the side with both ends bent inwards in the circumferential direction so as to form a C-shape. Circular holes 11a are formed at the bent end parts at both ends.

FIG. 8 illustrates a second joint plate 12. The second joint plate 12 is a short aluminum plate that is slightly shorter than the arc portion of the first joint plate 11, with identical circular holes 12a provided at the bent ends of the second joint plate 12.

FIG. 9 illustrates a third joint plate 13. The third joint plate 13 is an aluminum plate which is generally arc-shaped when viewed from the side. Both ends of the plate 13 are bent inwards (in an arc which is opposite in direction to the center arc of the joint plate) in a circumferential direction so as to form a C-shape, with holes 13a provided at both bent ends.

Figure 10:
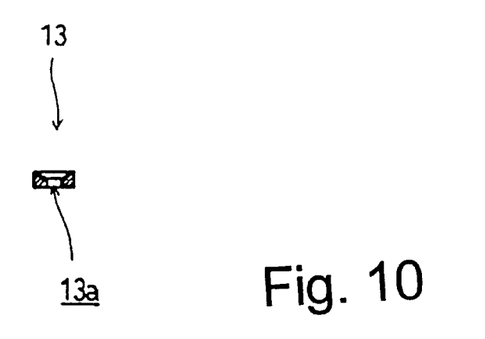
FIG. 10 is a cross-sectional view taken along line X—X of FIG. 9;.

The distances between circular holes 13a of the third joint plate 13 and between the circular holes 11a of the first joint plate 11 are equal. As shown in FIG. 10, the cross-section of the circular hole 13a has a tapered section where the diameter of the hole is made broader towards one surface of the circular hole 13a. The circular holes 11a and 12a of the first and second joint plates 11 and 12 also have these tapered sections.

The outer stator 1 is assembled from the stator core 2, the plurality of bus bars 5 and the first, second and third joint plates 11, 12 and 13.

Figure 11:
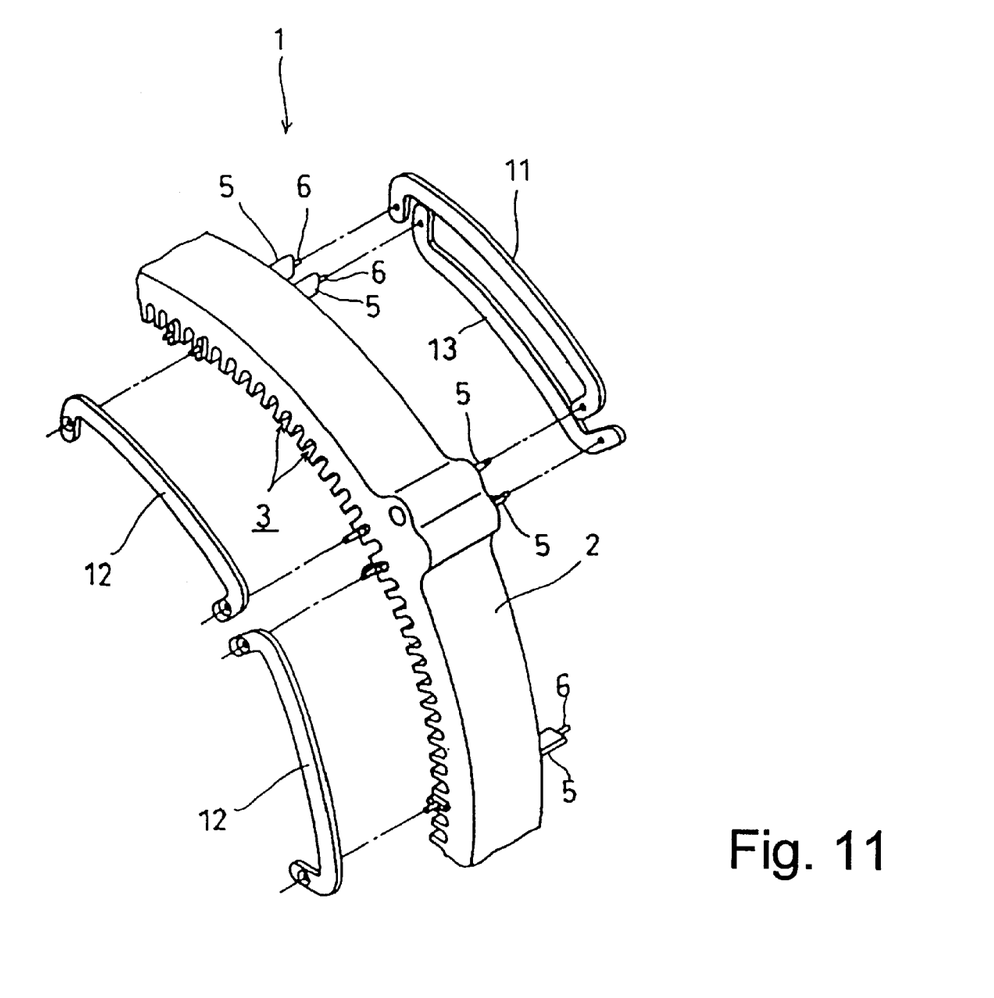
FIG. 11 is a partial perspective view showing the assembly of bus bars and joint plates at the stator core.

A partially assembled state is shown in FIG. 11. Bus bars 5 are inserted into the slots 3 of the stator core 2, and projections 6 of two prescribed bus bars 5 pass through the circular holes 12a and 12a of a second joint plate 12 arranged along one side of the stator core 2. The ends of the projections 6 are then crushed so as to provide a calked coupling. The first joint plate 12 and the third joint plate 13 provided along the other side of the stator core 2 are also coupled in a riveted manner to projections 6 and 6 of two prescribed bus bars 5 and 5 in the same manner.

The first, second and third joint plates 11, 12 and 13 are arranged so that the tapered sections of the circular holes 11a, 12a and 13a are on the opposite side (outer side) of the stator core 2. The tips of the projections 6 of the bus bars 5 that pass through the circular holes 11a, 12a and 13a are then crushed using a press so as to spread out into the tapered sections and provide calked coupling (see FIG. 2).

The work involved in this coupling is straightforward and the surface of the joint plate can be kept flat because the riveted portions of the projections 6 spread out into the tapered sections, and therefore do not project from the surfaces of the joint plates.

Figure 12:
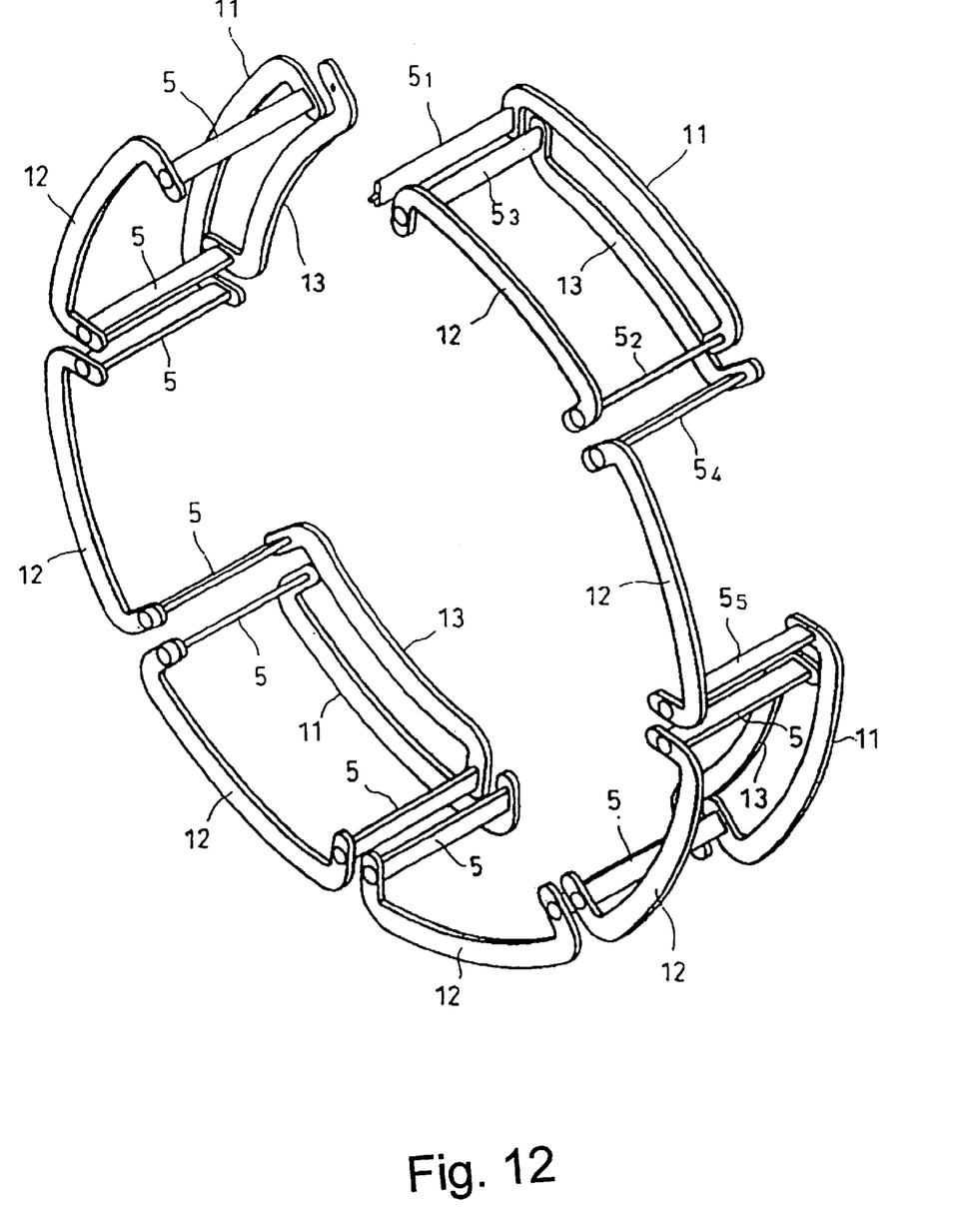
FIG. 12 is a perspective view showing part of a coupling structure for an armature circuit.

FIG. 12 shows a continuous coupling structure for a single phase armature circuit with the stator core 2 omitted. For illustrative purposes, a front side is indicated by reference sign 18 (the front surface of the fixed stator 2) and a rear side is indicated by the reference sign 19 (the rear surface of the stator core 2).

A bus bar $5_1$ and a bus bar $5_2$ fifteen slots around to the right from the bus bar $5_1$ are connected by the first joint plate 11 on the rear side. The bus bar $5_2$ and a bus bar $5_3$ thirteen slots back around to the left are coupled by the second joint plate 12 at the front side. The bus bar $5_3$ and a bus bar $5_4$ fifteen slots around to the right are coupled by a third joint plate 13 to the rear side. The bus bar $5_4$ and a bus bar $5_5$ thirteen slots around to the right are coupled at the front side by a second joint plate 12. The above coupling cycle is then repeated for three and a half cycles until just before a complete cycle is made.

Neighboring bus bars $5_1$ and $5_2$, and $5_2$ and $5_4$ etc. are structured so that current flows in the same direction in neighboring bus bars. This continuous bus bar continuously coupled structure and another type of bus bar continuously coupled structure are shifted with respect to each other in a slotwise direction so as to constitute a single-phase armature circuit, with a further two phases also being provided shifted in a slotwise direction to provide a three-phase armature circuit.

Figure 2:
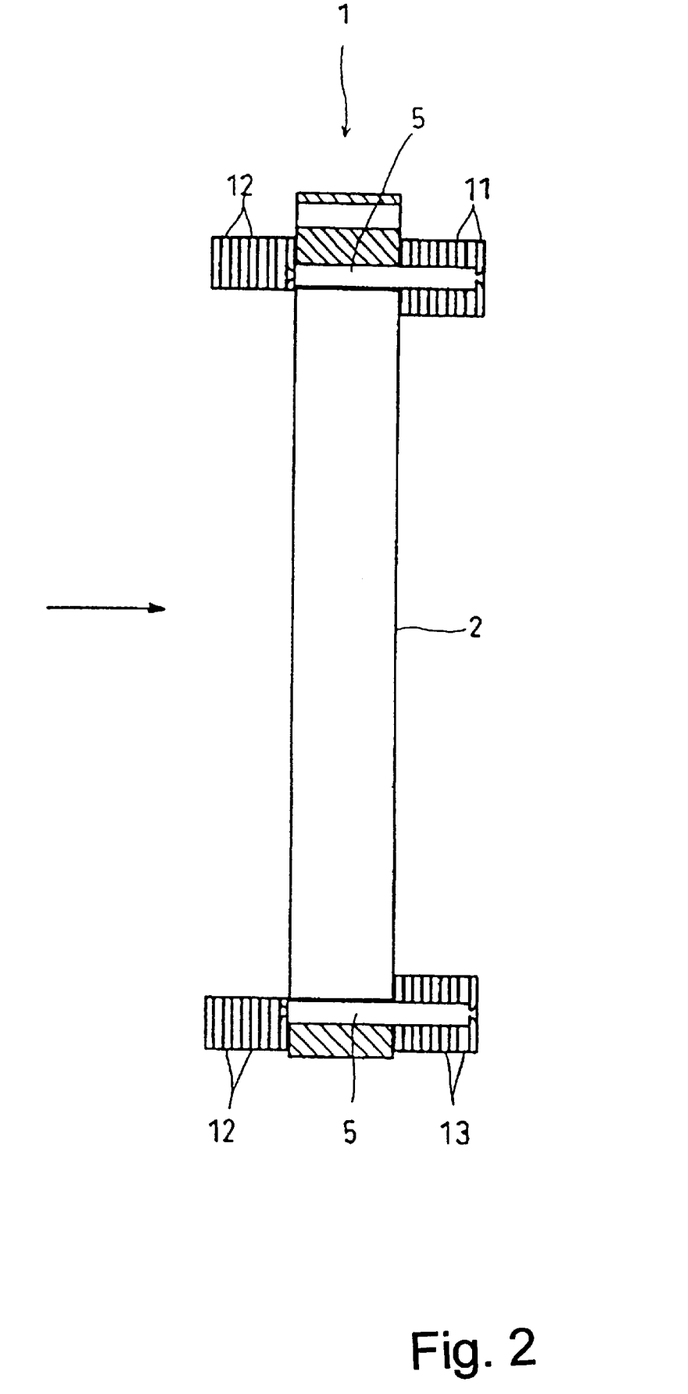
FIG. 2 is a cross-section taken along line II—O—II of FIG. 1.
Figure 3:
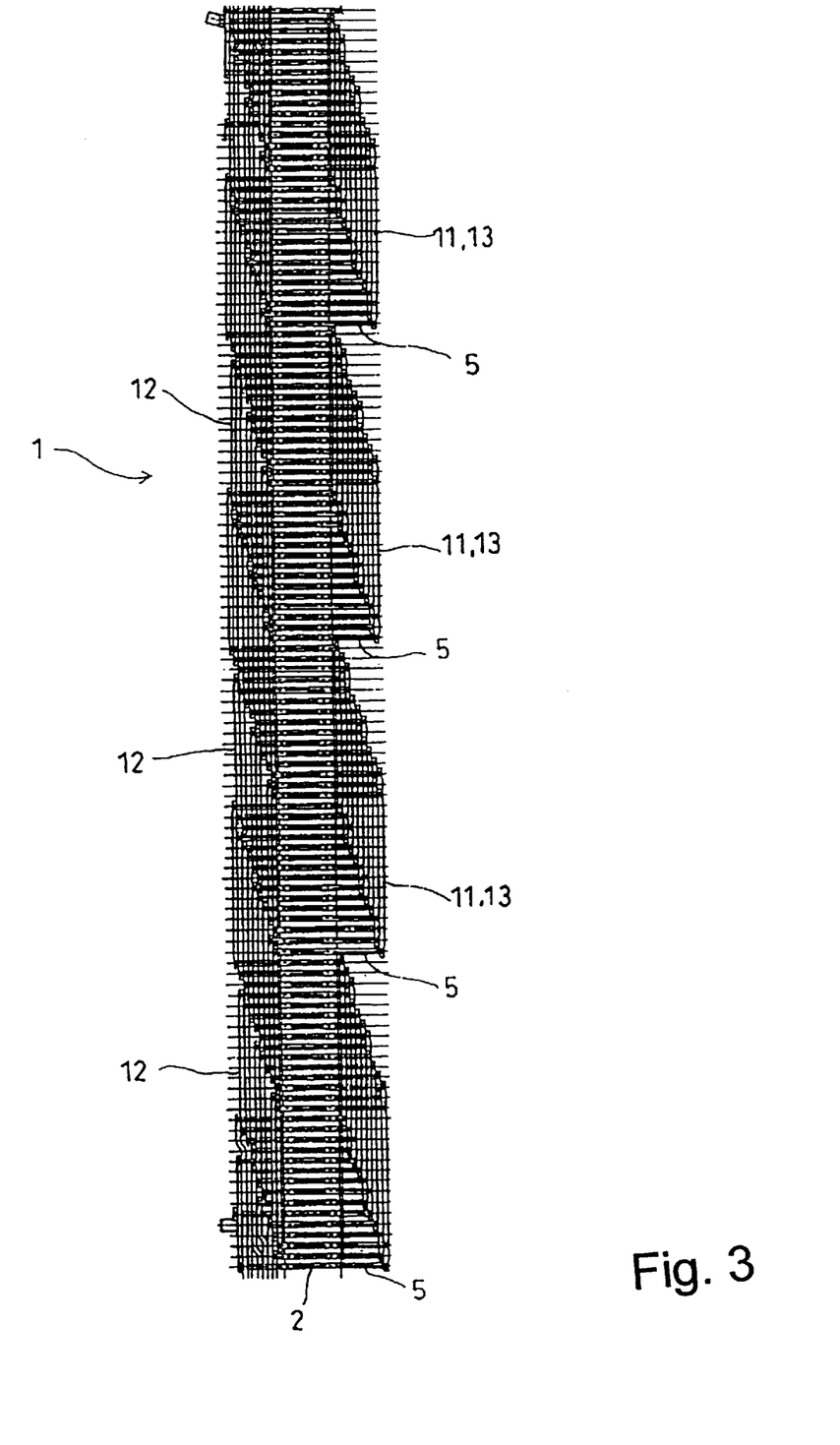
FIG. 3 is an expanded view of the outer stator.

As shown in FIG. 2 and FIG. 3, the second joint plate 12 is overlaid at the front surface of the stator core 2 with insulating paper sandwiched therebetween, and the first joint plate 11 and the third joint plate 13 are provided at the rear surface of the stator core 2 with insulating paper sandwiched therebetween.

The rivet coupling circular holes 13a of the third joint plate 13 arranged at the rear surface of the stator core 2 are, at bent end sections, bent outwards away from the center of the stator core 2. The main body therefore projects slightly inwards towards the center of the stator core 2 (refer to FIG. 1 and FIG. 2). The inner rotor can therefore be inserted from the front surface of the stator core 2 without being hindered by the third joint plate 13, i.e., it is inserted in the direction of the arrow of FIG. 2.

Regarding the outer stator 1 of the d.c. brushless motor, one bus bar 5 is inserted into one slot 3 of the stator core 2 and the cross-section of the bus bar substantially coincides with the cross-section of the slot 3. The capacity within the slot is therefore utilized in an effective manner and the space for the conductor is maximized.

Further, the slots 3 are substantially rectangular so as to be long in the radial direction of the fixed core 2, and a large number of slots 3 can be formed at the inner peripheral surface of the stator core 2. Therefore, a large number of bus bars 5 can be inserted.

The ends of the bus bars 5 engage with the joint plates in a vertical manner and there is therefore no need to bend the bus bars themselves. It is therefore easy to maintain the cross-sectional area of the bus bar 5 taken as a conductor and a large space can be maintained within the slot 3.

According to the above configuration, current flows effectively in the armature conductor of the bus bar 5, ohmic loss is reduced, superior cooling can be maintained, and miniaturization can be achieved.

The bus bars 5 and the first, second and third joint plates 11, 12 and 13 are made of aluminum and are therefore lightweight and cheap.

Only three types of members are required for coupling the bus bars 5, and the bus bars 5 are directly inserted into the slots 3 in a straightforward manner. The coupling of the first, second and third joint plates 11, 12 and 13 is done by riveting, which simplifies assembly.

The outer stator is also compact because the plate-shaped first, second and third joint plates 11, 12 and 13 are laid onto the sides of the stator core 2.

Figure 13:
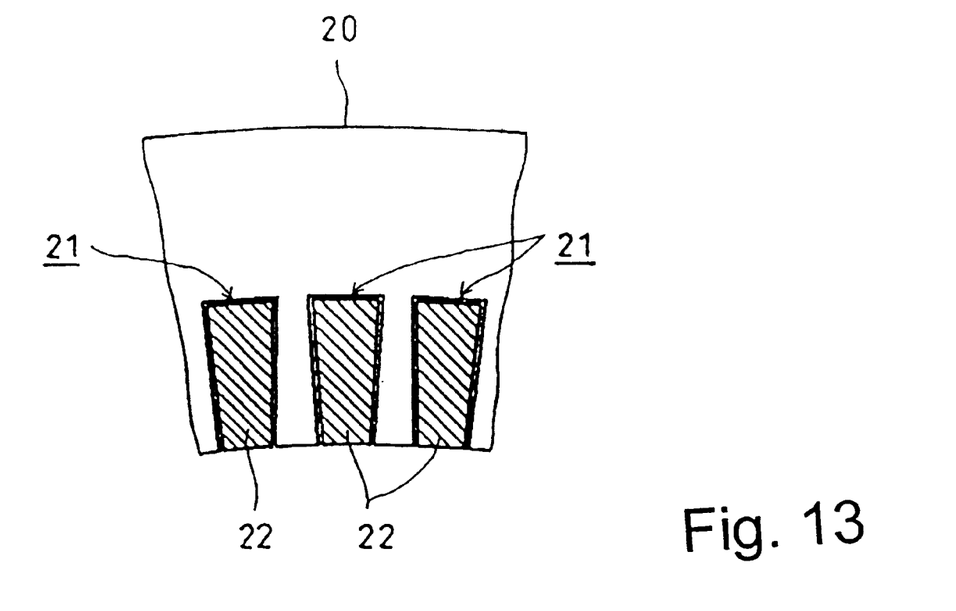
FIG. 13 is a partial cross-section of a stator of a second embodiment of the present invention.

FIG. 13 illustrates a second embodiment of the present invention, having a different shape for the slots in the stator core. A slot 21 of a stator core 20 has a cross-section that is trapezoidal in shape, and long in the radial direction of the stator core 20, with an outer short side being larger than an inner short side of the trapezoid.

An aluminum bus bar 22 of a trapezoidal cross-sectional shape that is the same as the trapezoidal cross-sectional shape of the slot 21 is then inserted into the slot 21.

Prescribed pairs of bus bars 22 are then coupled in the same manner using the joint plates. A small motor utilizing conductor bus bar 22 is easily maintained. Also, a large space can be maintained within the slot 21, ohmic loss can be reduced, and cooling is superior.

Figure 14:
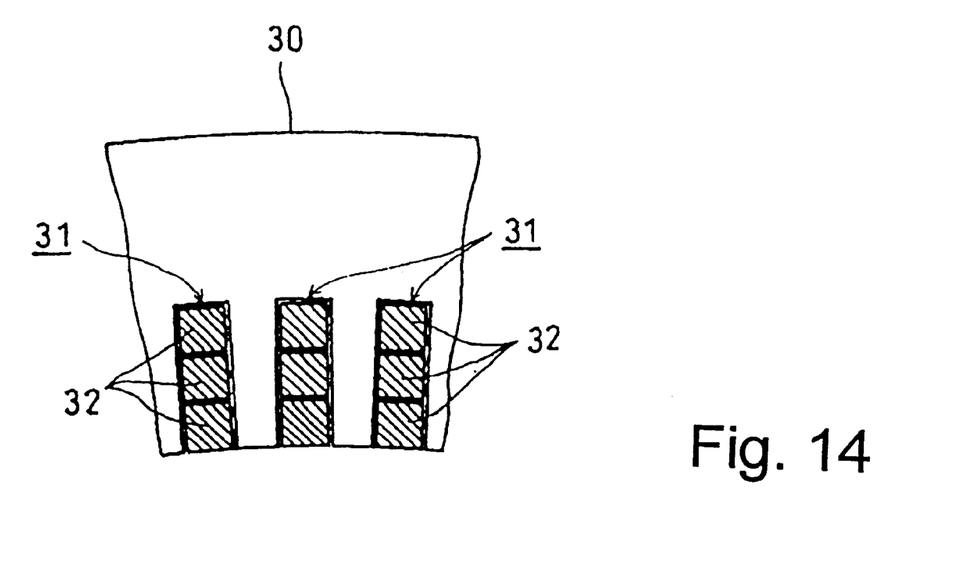
FIG. 14 is a partial cross-section of a stator of a third embodiment of the present invention.

FIG. 14 shows a third embodiment of the present invention. A stator core 30 has slots 31 of rectangular cross-section and long in the radial direction of the stator core 30. Three bus bars 32, each being rectangular in cross-section, are inserted into each of the slots 31.

The three bus bars 32 are aluminum and together have a cross-section substantially equal to the cross-section of the rectangular cross-section of the slot 31. The slot 31 is substantially filled and the available space utilized is therefore high.

Various modifications to the cross-sectional shape of the slots can utilized, as well as the insertion of two or more conductors into a slot.

In the above, the outer stator is applied to a d.c. brushless motor, but can also be applied to a synchronous motor and other types of motors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor stator structure comprising:
a stator core including a plurality of slots aligned with an axial direction of the stator core;
a plurality of conductors, each conductor including a bus bar being disposed within one of said plurality of slots and having a cross-section which substantially conforms with a cross-section of its respective slot; and
a plurality of joint plates including first joint plates and second joint plates, the joint plates being arc-shaped and arranged along side surfaces of the stator core, wherein an end of each joint plate is riveted to an end of a bus bar and said second joint plates are shorter than said first joint plates, the ends of the first and second joint plates extending radially inwardly.

2. The motor stator structure of claim 1, wherein one conductor is inserted into each slot.

3. The motor stator structure of claim 1, wherein the slots of the stator core have substantially flat side surfaces.

4. The motor stator structure of claim 3, wherein the slots have a curved inner surface.

5. The motor stator structure of claim 3, wherein the slots have a trapezoidal cross-section.

6. The motor stator structure of claim 3, wherein the slots have a rectangular cross-section, each slot containing a plurality of conductors.

7. The motor stator structure of claim 3, wherein the slots have a width extending along a circumferential direction of the stator core and a depth extending along a radial direction of the stator core, the depth being larger than the width.

8. The motor stator structure of claim 1, wherein the conductors are substantially straight bus bars.

9. The motor stator structure of claim 1, wherein the plurality of joint plates includes third joint plates having ends extending outwardly from a center of the outer stator core, the third joint plates being arranged on side surfaces of the stator core.

10. The motor stator structure of claim 9, wherein the first, second and third joint plates include holes at their ends, the distance between the holes in the first joint plates being equal to the distance between the holes in the third joint plates, and the distance between the holes in the second joint plates being less than the distance between the holes in the first joint plates.

11. The motor stator structure of claim 9, wherein:
a first bus bar and a second bus bar disposed in a slot fifteen slots clockwise from the first bus bar are connected by a first joint plate; and
the second bus bar and a third bus bar thirteen slots counterclockwise from the second bus bar are connected by a second joint plate.

12. The motor stator structure of claim 11, wherein:
the third bus bar and a fourth bus bar fifteen slots clockwise from the third bus bar are coupled by a third joint plate; and
a fourth bus bar and a fifth bus bar thirteen slots clockwise from the fourth bus bar are coupled by a second joint plate.

13. A motor stator structure comprising:
a stator core including a plurality of slots aligned with an axial direction of the stator core;
a plurality of substantially straight conductors disposed in the plurality of slots in the stator core; and
a plurality of joint plates, the joint plates connecting ends of the conductors to form circuits in the motor stator structure, wherein the substantially straight conductors include deformable end portions, the deformable end portions being deformed during assembly of the motor stator structure to secure the end portions within holes in the joint plates.

14. The motor stator structure of claim 13, wherein each slot contains one of said conductors with a conductor substantially filling the volume of its respective slot, and the cross-section of a conductor substantially conforming with the cross-section of its respective slot.

15. A motor stator structure comprising:
a stator core including a plurality of slots aligned with an axial direction of the stator core;
a plurality of conductors, each conductor including a bus bar disposed within one of said plurality of slots and having a cross-section which substantially conforms with a cross-section of its respective slot; and
a plurality of joint plates, the joint plates being arc-shaped and arranged along side surfaces of the stator core, wherein said bus bars have a center portion and deformable end portions, the end portions being deformed during assembly of the motor stator structure to engage holes in the ends of the joint plates.

* * * * *